US012591612B1

(12) United States Patent
You et al.

(10) Patent No.: US 12,591,612 B1
(45) Date of Patent: Mar. 31, 2026

(54) MULTIMODAL WEB PAGE CONTENT CLASSIFICATION WITH KNOWLEDGE GRAPH-BASED EXPLAINABILITY

(71) Applicant: Palo Alto Networks, Inc., Santa Clara, CA (US)

(72) Inventors: Zeyu You, Sunnyvale, CA (US); Wei Wang, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/060,115

(22) Filed: Feb. 21, 2025

(51) Int. Cl.
 *G06F 16/35* (2025.01)
 *G06F 16/34* (2019.01)
 *G06F 16/901* (2019.01)

(52) U.S. Cl.
 CPC ............ *G06F 16/35* (2019.01); *G06F 16/345* (2019.01); *G06F 16/9024* (2019.01)

(58) Field of Classification Search
 CPC .... G06F 16/35; G06F 16/345; G06F 16/9024; G06F 16/685
 USPC ................ 707/729, 734, 736, 737, 999.009, 707/E17.142; 715/239, 716, 763, 854; 704/9, 235, 243, 260, 270.1
 See application file for complete search history.

(56) References Cited

U.S. PATENT DOCUMENTS

| | | | | |
|---|---|---|---|---|
| 11,809,480 B1* | 11/2023 | Cheng | .................. | G06F 16/434 |
| 2019/0325084 A1* | 10/2019 | Peng | .................... | G06F 16/243 |
| 2024/0121125 A1* | 4/2024 | Blair | .................... | G06F 40/263 |
| 2024/0386015 A1* | 11/2024 | Crabtree | ............ | G06F 16/9024 |
| 2025/0259075 A1* | 8/2025 | Crabtree | ............... | G06N 3/092 |
| 2025/0259144 A1* | 8/2025 | Crabtree | ............ | G06Q 30/0601 |
| 2025/0335705 A1* | 10/2025 | Lin | ....................... | G06F 16/685 |

* cited by examiner

*Primary Examiner* — Md I Uddin
(74) *Attorney, Agent, or Firm* — Gilliam IP PLLC

(57) ABSTRACT

A multimodal web page content classification system ("classification system") uses summarization, extraction, and knowledge graph generation to classify web page content. For each of multiple modalities, the classification system summarizes web page content corresponding to that modality and then identifies key phrase/concept pairs in that modality summary. The classification system builds a knowledge graph from the key phrase/concept pairs as well as known concept/category pairs. Finally, the classification system invokes a classifier on a representation of the knowledge graph to obtain a category classification, resulting in an interpretable classification via the modality summaries and knowledge graph.

20 Claims, 6 Drawing Sheets

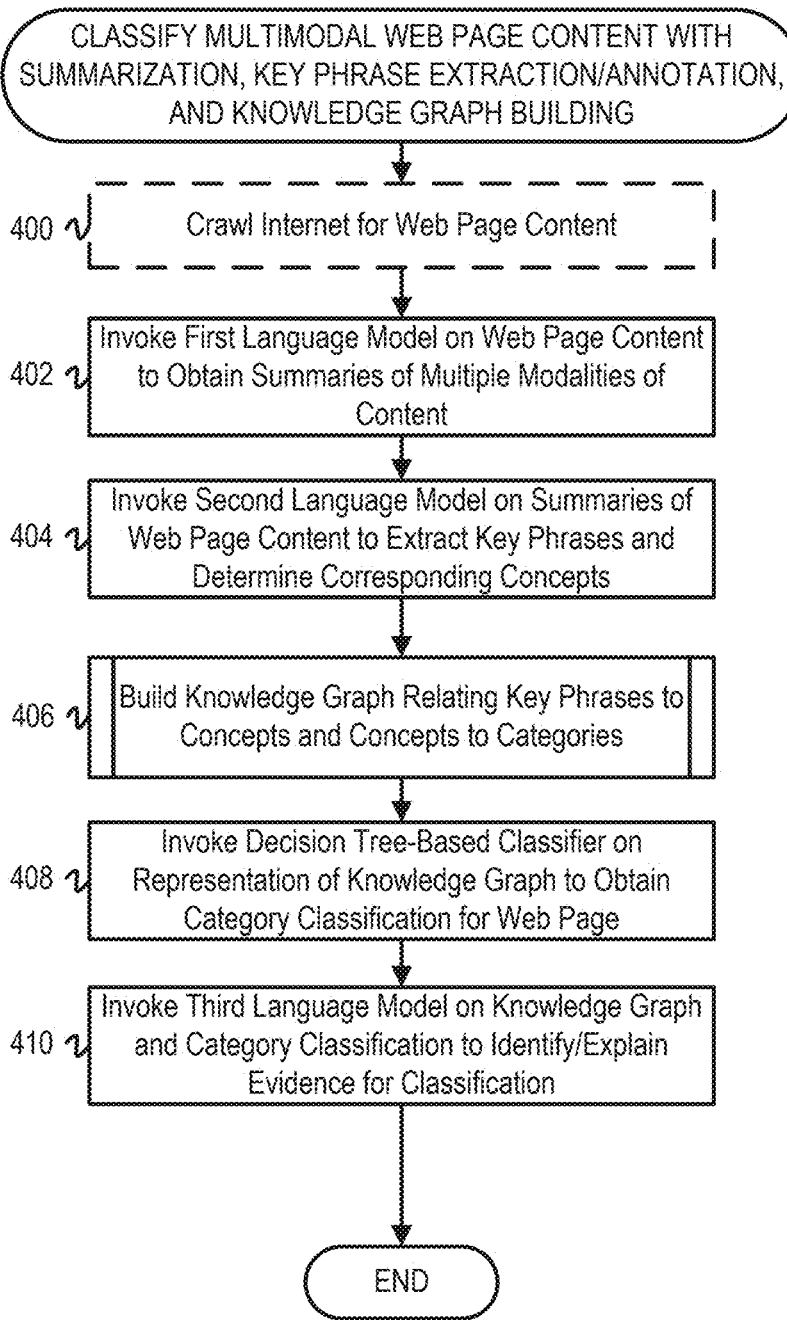

CLASSIFY MULTIMODAL WEB PAGE CONTENT WITH SUMMARIZATION, KEY PHRASE EXTRACTION/ANNOTATION, AND KNOWLEDGE GRAPH BUILDING

400 — Crawl Internet for Web Page Content

402 — Invoke First Language Model on Web Page Content to Obtain Summaries of Multiple Modalities of Content 404 — Invoke Second Language Model on Summaries of Web Page Content to Extract Key Phrases and Determine Corresponding Concepts 406 — Build Knowledge Graph Relating Key Phrases to Concepts and Concepts to Categories 408 — Invoke Decision Tree-Based Classifier on Representation of Knowledge Graph to Obtain Category Classification for Web Page 410 — Invoke Third Language Model on Knowledge Graph and Category Classification to Identify/Explain Evidence for Classification

END

FIG. 4

MULTIMODAL WEB PAGE CONTENT CLASSIFICATION WITH KNOWLEDGE GRAPH-BASED EXPLAINABILITY

BACKGROUND

The disclosure generally relates to data processing (e.g., CPC subclass G06F) and to computing arrangements based on specific computational models (e.g., CPC subclass G06N).

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model, and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large language models (LLMs) are based on the Transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning. For instance, a pre-trained language model can be fine-tuned on a training dataset of examples that pair prompts and responses/predictions. Prompt-tuning and prompt engineering of language models have also been introduced as lightweight alternatives to fine-tuning. Prompt engineering can be leveraged when a smaller dataset is available for tailoring a language model to a particular task (e.g., via few-shot prompting) or when limited computing resources are available. In prompt engineering, additional context may be fed to the language model in prompts that guide the language model as to the desired outputs for the task without retraining the entire language model or changing the weights of the language model.

BRIEF DESCRIPTION OF THE DRAWINGS

Embodiments of the disclosure may be better understood by referencing the accompanying drawings.

FIG. 4 is a flowchart of example operations for multimodal web page content classification with summarization, key phrase extraction/annotation, and knowledge graph building.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

The diversity and evolution of web page content pose a challenge for web page classification due to the complex nature of the data being classified. Previous rules-based, keyword-based, and encoding-based approaches struggle to accurately classify web pages in this landscape. In order to improve accuracy across a broad and nuanced range of web page categories, web page classifiers should leverage modalities of web page content while also being adaptable and explainable for making complex classifications. Moreover, in practice, a category of a web page can vary according to different angles/perspectives such as a business perspective, functionality perspective, and sensitivity perspective, resulting in overlapping categories. As a result, any category classification should be explainable and should account for category overlap. A multimodal web page content classification system ("classification system") disclosed herein is an adaptive framework for web page classification across multiple modalities that allows for easy addition and removal of modalities and captures complex relationships between key phrases, concepts, and categories in web page content.

The classification system operates in three stages—summarization, extraction, and classification. In the summarization stage, a summarization model receives web page content crawled from a web page as input and outputs summaries of the web page content for each configured modality (e.g., an image modality, a text modality, and a uniform resource locator (URL) modality). In the extraction stage, a web content annotator receives the summaries for each modality as input and outputs annotations for each summary that highlight key phrases and corresponding concepts. In the classification stage, a knowledge graph generator builds a knowledge graph for the web page first by initializing nodes for each highlighted key phrase and concept, with an edge indicating the relationship between the key phrase and the concept. The knowledge graph generator then relates concepts in the knowledge graph to categories based on known (previously obtained) concept-to-category mappings and adds nodes for the related categories to the knowledge graph with edges to the corresponding concepts. Finally, a decision tree classifier takes a representation of the knowledge graph as input and predicts a most likely category of the web page content given the knowledge graph. The resulting classification is explainable by tracing key phrases in the knowledge graph linked/connected to the predicted category and presenting the key phrases as explanations for the category classification.

Example Illustrations

Figure 1:
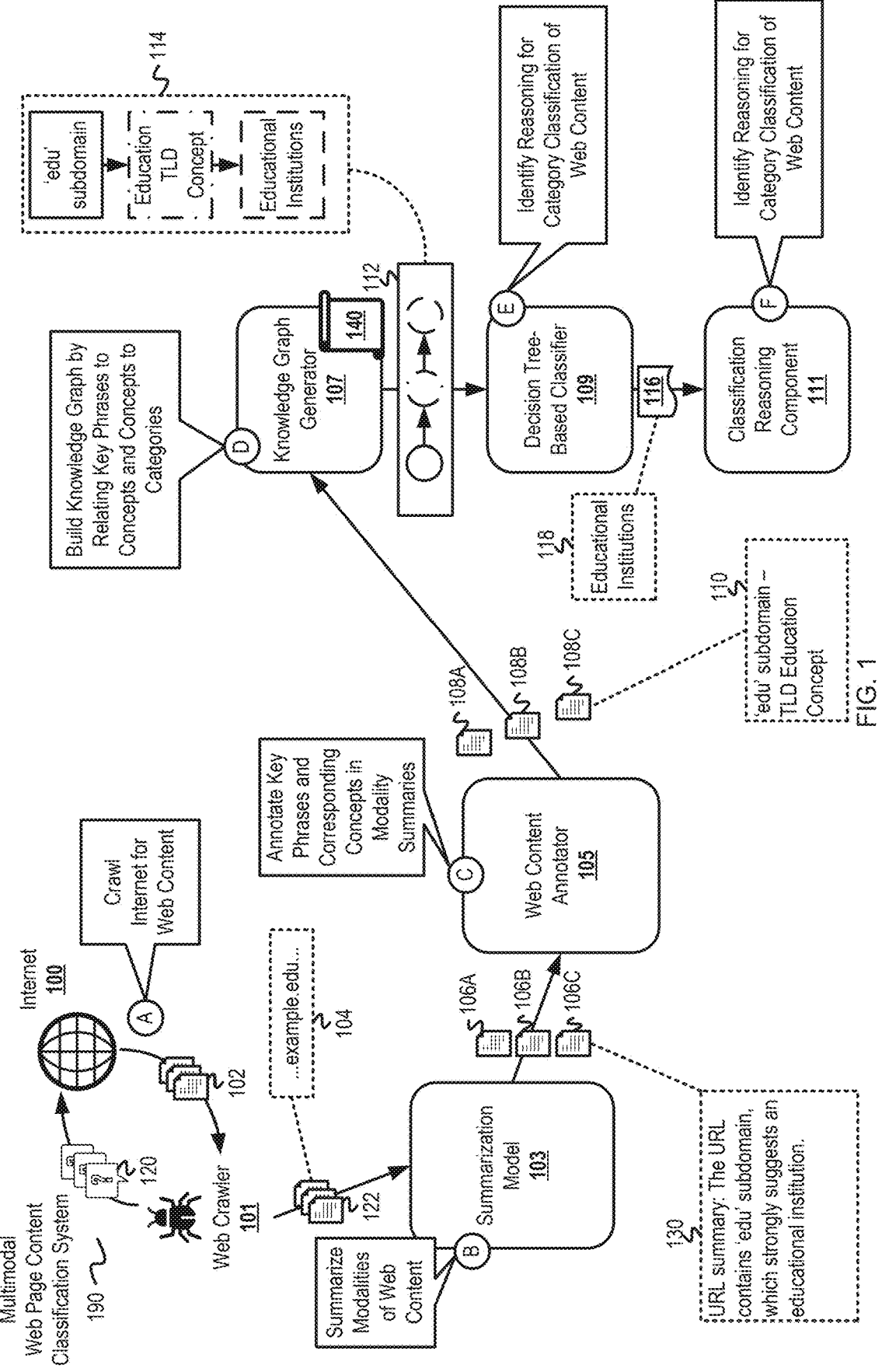
FIG. 1 is a diagram of a web page content classification system for classifying web page content using multimodal summarization, extraction, and knowledge base generation.

FIG. 1 is a diagram of a web page content classification system for classifying web page content using multimodal summarization, extraction, and knowledge base generation. A multimodal web page content classification system ("classification system") 190 comprises a web crawler 101 crawling the Internet 100 for content. As the web crawler 101 crawls web page content (e.g., Hypertext Markup Language (HTML) documents from Hypertext Transfer Protocol (HTTP) responses) from the Internet 100, the web crawler 101 communicates the web page content to a summarization model 103. The summarization model 103 summarizes the web page content according to each configured modality and communicates the per-modality summaries to a web content annotator 105. The web content annotator 105 identifies key phrases in each per-modality summary and further associates each key phrase with a corresponding known concept. A knowledge graph generator 107 receives the key phrase/concept pairs and uses the pairs to build/generate a knowledge graph that represents relationships between key phrases and concepts as well as relationships between concepts and categories for web page content. A decision tree-based classifier 109 receives a representation of the knowledge graph as input and outputs a category classification for the web page content. Lastly, a classification reasoning component 111 analyzes the knowledge graph and category classification to explain the category classification alongside evidence for the classification (e.g., key phrases linked/connected to the category classification in the knowledge graphs and intervening concepts).

FIG. 1 is annotated with a series of letters A-F representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the web crawler 101 communicates queries 120 (e.g., HTTP requests) to the Internet 100 and receives responses 102 (e.g., HTTP responses). The web crawler then extracts web page content 122 from the responses 102 according to the type and format of web page content for each modality that the classification system 190 is configured to process. For instance, the web crawler 101 can extract text data in HTML documents, HTTP header field values, etc. from the responses 102 and can render the responses 102 to obtain screenshots/image data. The web crawler 101 crawls the Internet 100 according to its crawling policy that can, for example, crawl web pages corresponding to newly seen or registered domains, domains that have not been crawled recently, domains indicated as high risk for malicious activity, domains frequently accessed by users of an organization, etc. The web crawler 101 communicates the extracted web page content 122 to the summarization model 103. In the example depicted in FIG. 1, the web page content 122 includes an example URL 104 "example.edu". For the remaining operations in FIG. 1, the web page content 122 is assumed to correspond to a single web page, although operations can occur in parallel across multiple web pages.

At stage B, the summarization model 103 summarizes the web page content 122 according to each of the multiple modalities. The modalities in the example depicted in FIG. 1 include an image modality to produce an image summary 106A, a text modality to produce a text summary 106B, and a URL modality to produce a URL summary 106C. An example URL summary 130 comprises the text "URL summary: The URL contains 'edu' subdomain, which strongly suggests an educational institution." The summarization model 103 comprises any language-based model capable of taking web page content of multiple, diverse modalities as input and producing summaries of the web page content for the multiple modalities as output. In some embodiments, the summarization model 103 can comprise a separate model for each modality.

As an illustrative example, the summarization model 103 can comprise an LLM that is invoked with the following prompt:

Summary task: You are a website analyzer and given multimodal data including a URL modality, web crawled text modality and screenshot modality data, please write a short summary up to 2-3 sentences within 100 words of each modality and write an overall summary given each modality summary and highlights in string format only (3 bullets of 2-3 words for each bullet about details on website function and industry field, business type). Please return the response in the following JSON format: {UrlSummary: xxx, TextSummary: xxx, ImageSummary: xxx, Summary: xxx, Highlights: xxx}

Figure 2:
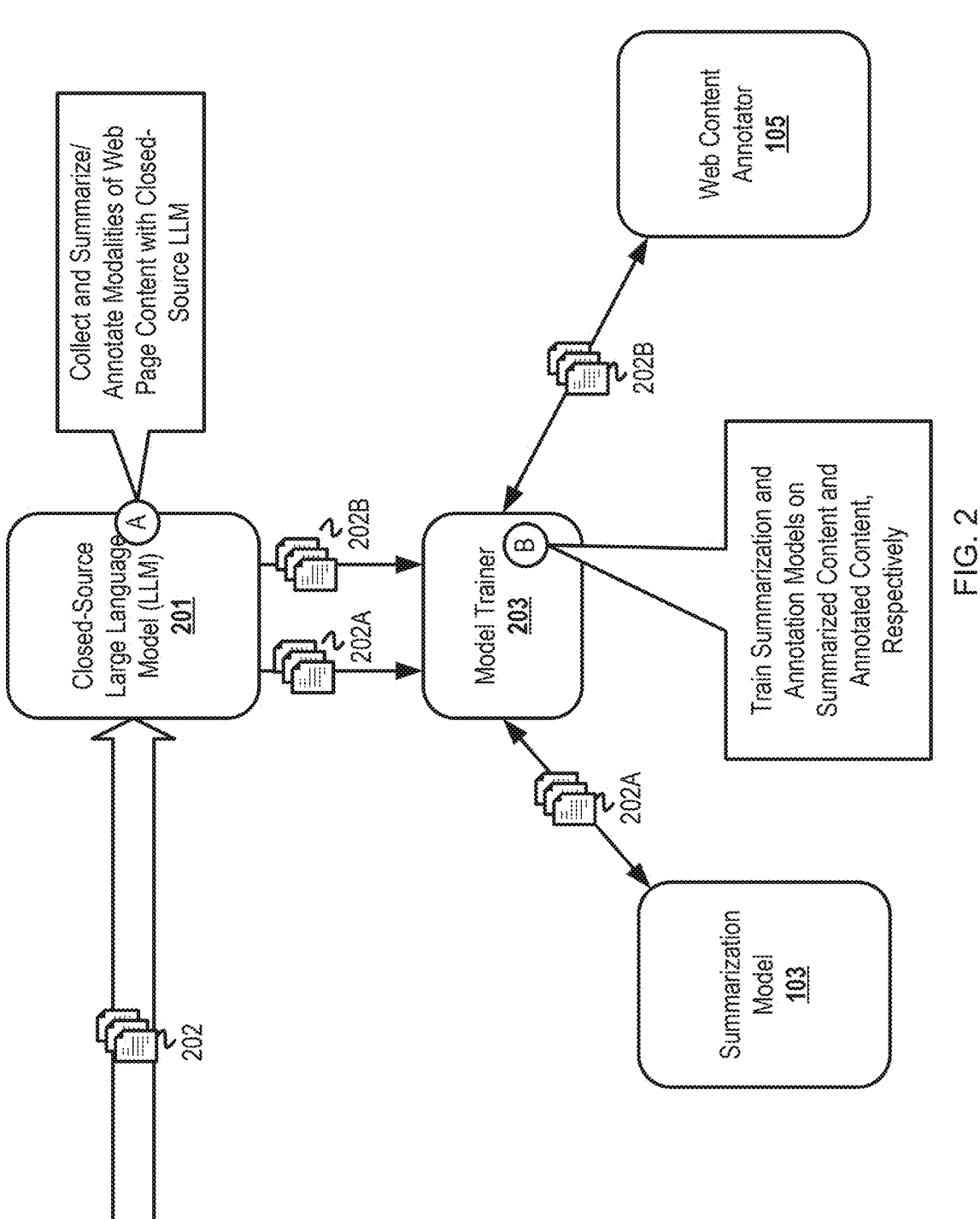
FIG. 2 is a diagram of an example system for training web content summarization and annotation models using a closed-source LLM.

Both the summarization model 103 and the web content annotator 105 can be trained, fine-tuned, etc. by a closed-source LLM (e.g., the OpenAI GPT-4@LLM) that generates example web page content/summaries and example web page content and annotations, respectively, as training data. FIG. 2 describes the training of the summarization model 103 and the web content annotator 105 with a closed-source LLM in greater detail.

At stage C, the web content annotator 105 receives and annotates key phrases and concepts in the per-modality summaries 106A-106C to obtain key phrase/concept pairs 108A-108C, respectively. An example key phrase/concept pair 110 corresponding to the URL modality comprises the text "'edu' subdomain—TLD Education Concept". In some embodiments, the web content annotator 105 may have low confidence in associating a key phrase with a concept and may indicate the key phrase without an associated concept. In other embodiments, the web content annotator 105 can annotate in two stages—a first stage to identify key phrases (e.g., using an LLM) and a second stage to determine concepts that correspond to key phrases. The concepts can be determined by generating embeddings of key phrases, clustering key phrases, and associating key phrases within each cluster with concept labels for that cluster. As illustrative examples, the web content annotator 105 can be a transformer-based concept tagging model (e.g., a bidirectional encoder representations from transformers (BERT) model or other transformer model) or an LLM.

At stage D, the knowledge graph generator 107 builds a knowledge graph 112 using the key phrase/concept pairs 108A-C by relating key phrases to concepts and concepts to categories. The knowledge graph generator 107 initializes an empty knowledge graph and adds nodes corresponding to each key phrase and concept in the key phrase/concept pairs 108A-C, with edges between each pair of nodes for a corresponding key phrase/concept pair. For key phrases that have no known concept, the knowledge graph generator 107 initializes nodes for the key phrases without any connected edges.

After initializing nodes for each key phrase and concept and adding corresponding edges, the knowledge graph generator 107 generates an embedding for each key phrase without a known concept in the knowledge graph 112 and determines a closest key phrase embedding cluster corresponding to a known concept. The knowledge graph generator 107 then groups the key phrase into the cluster having the known concept. The knowledge graph generator 107 then initializes a node in the knowledge graph 112 corresponding to the known concept (if not already present in the knowledge graph 112) and adds an edge from the node of the key phrase to the node of the known concept.

Because each concept output by the web content annotator 105 is a known concept, it is indicated in concept-tocategory mappings 140 previously defined/generated by the knowledge graph generator 107. These mappings 140 further indicate explanations of relationships between concepts and categories (e.g., "purpose for", "belongs to", etc.). Each concept can be mapped to multiple categories. For instance, an economic advice concept can be mapped to both a "stock_advice_tools" category and a "financial_services" category, as these categories are overlapping. After connecting key phrases to concepts, the knowledge graph generator 107 accesses the concept-to-category mappings 140, initializes a node for each category in the mapping that maps to a concept in the knowledge graph 112, then adds an edge between each category and corresponding concept in the mapping. The knowledge graph generator 107 can additionally maintain an index of overlapping categories and/or hierarchies of categories, and can add overlapping and/or hierarchical categories to the knowledge graph 112. Overlapping and hierarchical categories are connected by edges in the knowledge graph 112 indicating these overlapping or hierarchical relationships.

Figure 3:
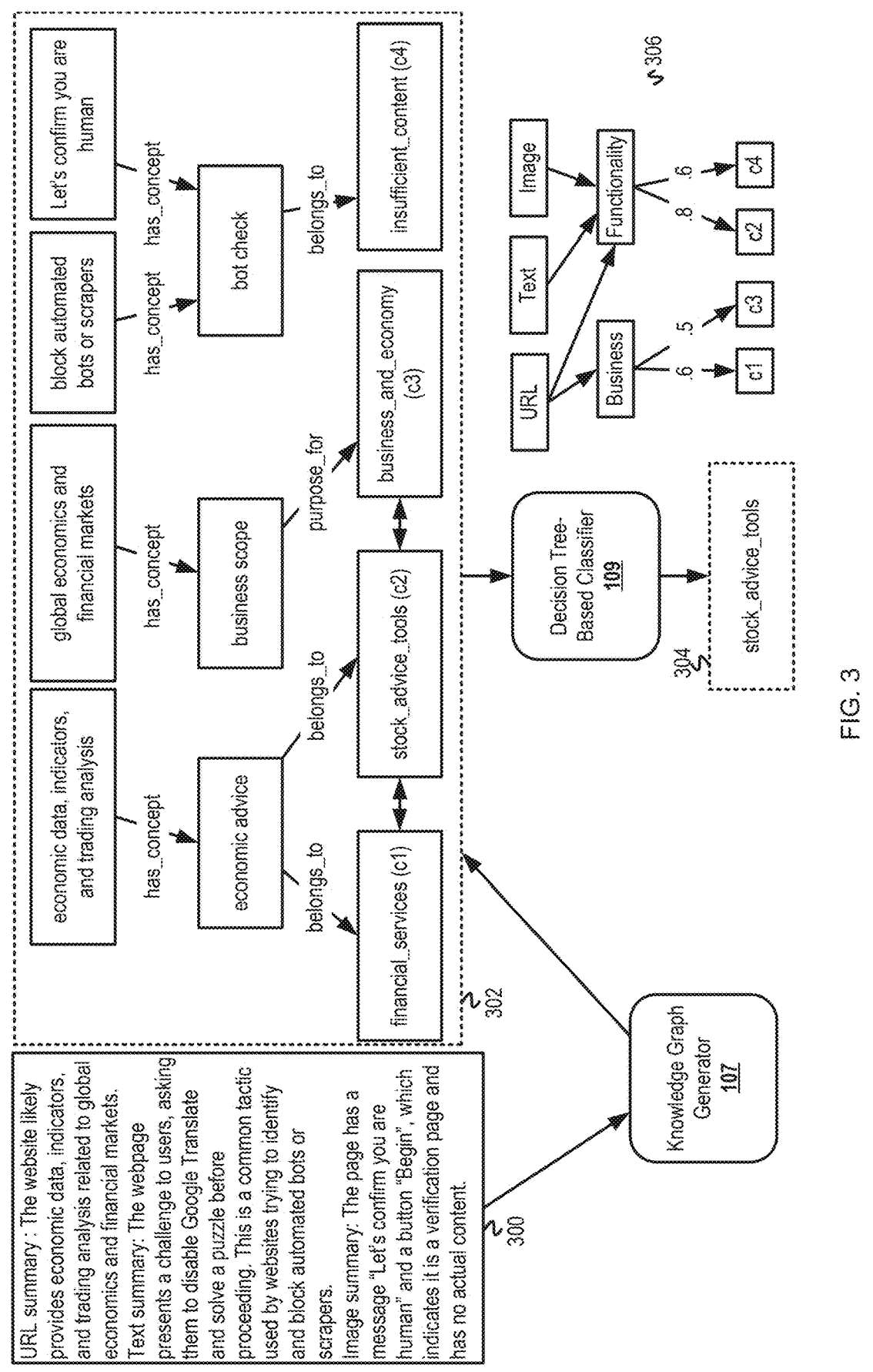
FIG. 3 is a diagram of example web page summaries, an example knowledge graph, and an example web page category classification.

An example knowledge graph 114 depicted in FIG. 1 comprises a key phrase "'edu' subdomain" connected to a concept "education TLD concept", and the concept "education TLD concept" connected to a category "educational institutions". A more detailed example knowledge graph is depicted in FIG. 3.

The concept-to-category mappings 140 are maintained by the knowledge graph generator 107 alongside the clusters of key phrase embeddings labelled with corresponding concepts. The knowledge graph generator 107 can periodically re-cluster the key phrase embedding clusters as key phrases are added to each cluster and can periodically evaluate the clusters for quality. The concept-to-category mappings 140 can be generated from structured data crawled from the Internet, for instance using organizational structure imposed on web pages via wikitext or any other markup language. These mappings 140 can be populated or refined using third-party sources such as Wikidata or other open-source repositories of knowledge graph data.

At stage E, the decision tree-based classifier 109 receives the knowledge graph 112 (or a representation of the knowledge graph 112) and determines a category 116 most likely to correspond to the web page content 122. The representation of the knowledge graph 112 can comprise a JavaScript® Object Notation (JSON) format representation of the knowledge graph 112 that includes each pair of nodes as well as key phrase/category/concept labels for the nodes and relationship labels for the edges. The decision tree-based classifier 109 comprises multiple decision trees configured to handle graph representations as input and whose verdicts can be combined (e.g., via majority vote) to obtain a final category classification. In the example in FIG. 1, the most likely category classification is example classification 118 "educational institutions".

At stage F, a classification reasoning component 111 infers a reasoning and/or explanation for the category 116. The classification reasoning component 111 can trace concepts and/or key phrases linked/connected to the category 116 in the knowledge graph 112. The classification reasoning component 111 can comprise a language model (e.g., an LLM) invoked on a prompt comprising the concepts/key phrases linked/connected to the knowledge graph 112, the corresponding relationships indicated at edges in the knowledge graph 112, and task instructions to explain why the web page corresponds to the category 116. The prompt can further comprise the web page content 122, the summaries 106A-106C, and/or the annotations 108A-108C. The language guage model provides a natural language explanations for the category 116, for instance to present to a user or administrator.

FIG. 1 describes determining relationships of key phrases to concepts by the web content annotator 105 and determining relationships of concepts to categories by the knowledge graph generator 107. These relationships can be determined by the same model (e.g., an LLM labeler to train the knowledge graph). Although the categories have a predefined list for known categories of web pages, concepts may not have a predefined list and may instead be inferred by a language model. The use of concepts when constructing knowledge graphs is an intermediary step to determining the category labels for key phrases (e.g., via clustering of embeddings to associate concepts with categories and via mapping of concepts to categories with an LLM or using third-party sources such as Wikidata). In some embodiments, key phrases may be directly associated with categories using any of the aforementioned techniques without the intermediate concepts. Additionally, concepts may be merged and associated with categories in a hierarchical structure of concepts and categories as more data is collected for each concept and as concepts are refined via corresponding clusters.

FIG. 2 is a diagram of an example system for training web content summarization and annotation models using a closed-source LLM. FIG. 2 depicts an embodiment of FIG. 1 where the summarization model 103 and the web content annotator 105 are trained (e.g., prompt tuned, fine-tuned, etc.) on training data obtained using a closed-source LLM 201. The closed-source LLM 201 is a heavyweight LLM that was trained to accomplish a wide array of natural language tasks such as the OpenAI GPT-4 LLM, the Meta Llama® 3.3 LLM, etc. The closed-source LLM 201 can be accessed via an application programming interface (API) that disallows access to internal architecture, training data, etc. of the closed-source LLM 201. By contrast, the summarization model 103 and the web content annotator 105 can be lightweight LLMs that are able to be trained and deployed on a local system without requiring external, proprietary-based access.

At stage A, the closed-source LLM 201 collects web page content 202 and summarizes/annotates modalities of the web page content to generate summaries 202A and annotations 202B. The web page content 202 is crawled from the Internet and parsed according to the various modalities (e.g., by extracting URLs, rendering web pages to obtain image data, extracting text-related HTML elements, etc.). A prompt to the closed-source LLM 201 to generate the summaries 202A can comprise the prompt in for the summarization model 103 described in the foregoing in reference to FIG. 1. A prompt for the closed-source LLM 201 to generate the annotations 208B can comprise the following text:

Annotation & Knowledge graph task: Given a webpage summary content, could you extract the most dominant 2 to 3 phrases up to 5 words in the input that talks about 1. business purpose aimed for (such as marketing, art, entertainment, health, medicine, real-estate, news, financial, risk, law, training, education, research, etc.); and 2. functionality website is built for (such as shareware, shopping, search engine, etc.); and 3. content sensitivity (such as adult, abortion, extremism, etc.). Please return the response in the following JSON format: {BusinessPhrases: [xxx], FunctionPhrases: [xxx], SensitivePhrases: [xxx], PhraseCategoryRelation: [xxx <relation>xxx]} The above prompt informs various perspectives of concepts—business, functionality, and sensitivity, without tasking the LLM 201 to determine concepts associated with key phrases. Although the prompt for the LLM 201 can also specify determining concepts for each key phrase, alternatively, the concepts for each key phrase to include in the annotations 202B can be determined by embedding each key phrase extracted by the LLM 201 and then determining a closest cluster of key phrase embeddings among multiple clusters of key phrase embeddings associated with concepts. The clusters of key phrase embeddings can be updated as key phrases are added by re-clustering, refining clusters, updating cluster centroids, etc.

At stage B, a model trainer 203 receives and uses the summaries 202A and the annotations 202B from the closed-source LLM 201 to train the summarization model 103 and the web content annotator 105, respectively. For example, the model trainer 203 can provide the web content and various modality summaries/annotations to the summarization model 103 and the web content annotator 105 as conversational context to inform subsequent summarization and annotation of web page content. Additionally or alternatively, the summarization model 103 and the web content annotator 105 can be fined tuned using the summaries 202A and the annotations 202B, respectively. The summarization model 103 and the web content annotator can be any language model able to perform the task of summarization and annotation, respectively, and can be language models such as BERT that are pre trained in addition to being fine-tuned.

FIG. 3 is a diagram of example web page summaries, an example knowledge graph, and an example web page category classification. FIG. 3 depicts the knowledge graph generator 107 and the decision tree-based classifier 109 from FIG. 1. Example web page summaries 300 comprise the following content for URL, text, and image modalities:

URL summary: The website likely provides economic data, indicators, and trading analysis related to global economics and financial markets.

Text summary: The webpage presents a challenge to users, asking them to disable Google Translate and solve a puzzle before proceeding. This is a common tactic used by websites trying to identify and block automated bots or scrapers.

Image summary: The page has a message "Let's confirm you are human" and a button "Begin", which indicates it is a verification page and has no actual content.

The knowledge graph generator 107 receives the example web page summaries 300 as input and outputs an example knowledge graph 302. The example knowledge graph 302 comprises example key phrase nodes "economic data, indicators, and trading analysis", "global economics and financial markets", "block automated bots or scrapers", and "Let's confirm you are human", example concept nodes "economic advice", "business scope", and "bot check", and example category nodes "financial_services (c1)", "stock_advice_tools (c2)", "business_and_economy (c3)", and "insufficient content (c4)". The "economic data, indicators, and trading analysis", "global economics and financial markets", "block automated bots or scrapers", and "Let's confirm you are human" nodes have "has_concept" relationships with the "economic advice", "business scope", "bot check" and "bot check" nodes, respectively. The "economic advice" node has a "belongs to" relationship with the "financial_services (c1)" and the "stock_advice_tools (c2)" nodes. The "business scope" node has a "purpose_for" relationship with the "business_and_economy (c3)" nodes. The "bot check" node has a "belongs to" relationship with the "insufficient_content (c4)" node. The "financial_services (c1)" and "stock_advice_tools (c2)" nodes are overlapping, and the "stock_advice_tools (c2)" and "business_and_economy (c3)" nodes are overlapping.

The decision tree-based classifier 109 receives the example knowledge graph 302 as input and outputs example category 304 corresponding to the "stock_advice_tools", i.e., c2 category. Example classification tree 306 corresponding to classification of the example knowledge graph 302 by the decision tree-based classifier 109 indicates that the URL modality corresponds to business and functionality perspectives of web page content via the c1, c2, and c3 categories, and that the text and image modalities correspond to the functionality perspective via the c4 category. The decision tree-based classifier 109 assigned likelihoods of 0.6, 0.8, 0.5, and 0.6 the categories c1, c2, c3, c4, respectively, for the example web page summaries 300 and corresponding web page.

Figure 5:
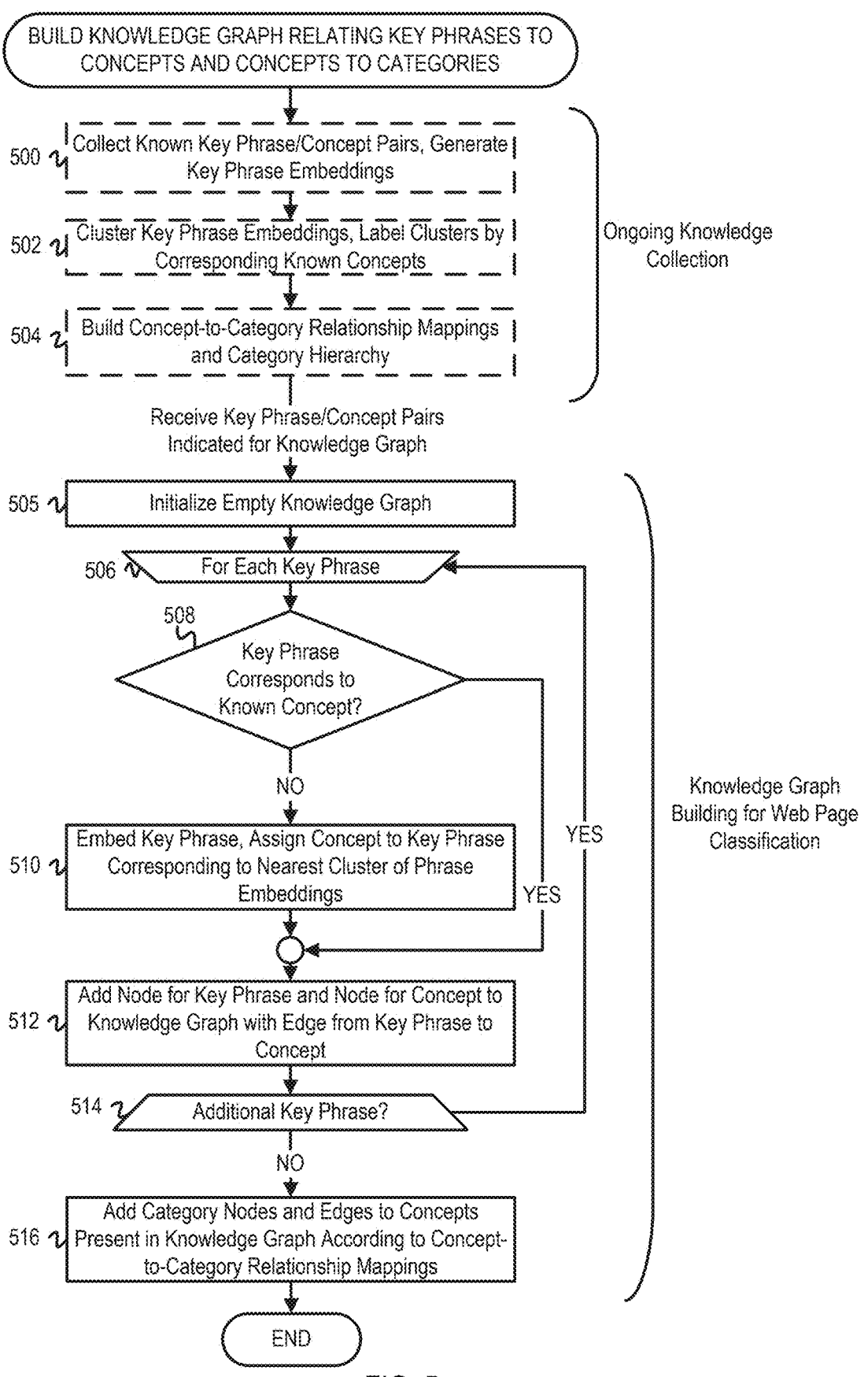
FIG. 5 is a flowchart of example operations for building a knowledge graph of web page content relating key phrases to concepts and concepts to categories.

FIGS. 4 and 5 are flowcharts of example operations for multimodal web content classification with summarization, key phrase extraction/annotation, and building of knowledge graphs according to relationships between key phrases and concepts, and concepts and categories. The example operations are described with reference to a multimodal web page content classification system ("classification system") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for multimodal web page content classification with summarization, key phrase extraction/annotation, and knowledge graph building. At block 400, the classification system crawls the Internet for web page content. The classification system crawls the Internet according to its crawling policy that accounts for recrawling, possibly malicious domain names, etc. The classification system can extract data for various modalities to be used for web content classification such as URLs, web page renders, text data in HTML documents, etc. Block 400 is depicted with a dashed outline to indicate that crawling the Internet for web page classification is ongoing for additional purposes to that depicted in FIG. 4 such as web indexing.

At block 402, the classification system invokes a first language model on the web page content to obtain summaries of multiple modalities of the content. The modalities include a URL modality, a text modality, and an image modality. The image modality comprises embedded images in the web page and/or a render of the web page. The first language model can be invoked with a first prompt comprising task instructions to summarize the web page content according to each modality, wherein the first prompt comprises a description of each modality. The first prompt can further comprise placeholders where extracted web page content for each modality is inserted.

At block 404, the classification system invokes a second language model on the summaries of web page content to extract key phrases and to determine corresponding concepts. The second language model can be invoked with a second prompt comprising task instructions to identify key phrases and corresponding concepts according to a predefined list of concepts. A template for the second prompt can further comprise placeholders where each summary for each modality is inserted. The task instructions can specify that the second language model identifies relationships between key phrases and concepts to later include in a knowledge graph, and can additionally specify to not identify a concept for a key phrase when the confidence of that key phrase corresponding to any of the list of concepts is insufficiently high. In some embodiments, rather than maintaining a list of concepts, the classification system can determine concepts based on cluster embeddings. When key phrases are not related to concepts by the second language model, the operations for relating key phrases to concepts using clusters of key phrase embeddings are described in greater detail in reference to FIG. 5.

At block 406, the classification system builds a knowledge graph relating key phrases to concepts and concepts to categories. The classification system builds the knowledge graph using the previously extracted key phrases and corresponding concepts, as well as a predefined mapping between concepts and categories and overlapping categories. The operations at block 406 are described in greater detail in reference to FIG. 5.

At block 408, the classification system invokes a decision tree-based classifier on a representation of the knowledge graph to obtain a category classification of the web page. The representation of the knowledge graph can comprise a JSON format representation of the knowledge graph that describes labels for each pair of nodes in association with a relationship defined by the edge between the pair of nodes. Although described as a decision tree-based classifier, the classification system can invoke any classifier (e.g., a graph neural network) that is able to take a representation of the knowledge graph as input and output a most likely category for the knowledge graph.

At block 410, the classification system invokes a third language model on the knowledge graph and category classification to identify/explain evidence for the classification. The classification system generates a third prompt that indicates key phrases/concepts in the knowledge graph linked/connected to the category classification, task instructions to identify/explain evidence for the category classification according to topology of the knowledge graph, and can further indicate summaries of the web page content modalities and/or the web page content itself. The classification system can communicate the category classification and explanation to a user or system logging web page classifications.

Although FIG. 4 describes using three language models, different implementations can use a same or two language models for the various tasks. The one or two language models can be fine-tuned, prompt tuned, trained, etc. for their respective, possibly multiple tasks.

Independent to the operations in FIG. 4 (e.g., in an offline pipeline for training/configuring the classification system), modules for different modalities of web page content in the summarization/extraction models can be added and removed. This can occur as domain-level experts identify new key modalities, determine that existing modalities are no longer high-quality for web content category classification, etc.

FIG. 5 is a flowchart of example operations for building a knowledge graph of web page content relating key phrases to concepts and concepts to categories. FIG. 5 assumes that key phrase and concept pairs have been extracted from summarized modalities of web page content. FIG. 5 is divided into two phases of operations that occur independently—a first phase for ongoing (as indicated by dashed outlines) knowledge collection at blocks 500, 502, and 504, and a second phase for knowledge graph building for web classification at blocks 505, 506, 508, 510, 512, 514, and 516. The second phase of operations occurs in response to receiving key phrase/concept pairs indicated for a knowledge graph for web classification.

At block 500, the classification system collects known key phrase/concept pairs and generates key phrase embeddings. The known key phrase/concept pairs can be obtained by invoking any of the aforementioned annotation-based models for modalities of web page content when the confidence of the known key phrase/concept is sufficiently high. Additionally or alternatively, known key phrase/concept pairs can be determined by manual inspection of web page content by a domain-level expert. The embeddings of key phrases can comprise any natural language processing (NLP) embeddings (e.g., word2vec).

At block 502, the classification system clusters key phrase embeddings and labels the clusters by the corresponding known concepts. As additional key phrases are associated with concepts, clusters can be periodically updated/re-clustered/refined. The clusters are to be used for associating key phrases with concepts according to the clusters when there are no high confidence concepts corresponding to a key phrase. The clustering algorithm for clustering can depend on dimensionality of the key phrase embeddings. For instance, the k-means clustering algorithm can be used for low dimensional key phrase embeddings, whereas the Hierarchical Density-Based Spatial Clustering of Applications with Noise (HDBSCAN) algorithm can be used for high dimensional key phrase embeddings.

At block 504, the classification system builds concept-to-category relationship mappings and a category hierarchy. For instance, the classification system can crawl the Internet for wikitext or other markup of web page content that indicates relationships between headers and content in the web page content. The concept-to-category mappings and the hierarchy of concepts can be obtained by identifying concepts and categories in the web page content and determining the relationships according to the markup. The category hierarchy specifies both overlapping categories and a hierarchy of categories.

At block 505, the classification system initializes an empty knowledge graph. The knowledge graph can be initialized according to a data structure that stores a representation of the knowledge graph in memory (e.g., a JSON format file).

At block 506, the classification system begins iterating through each key phrase indicated in the key phrase/concept pairs.

At block 508, the classification system determines whether the key phrase corresponds to a known concept indicated in the key phrase/concept pairs (i.e., a model that annotated a corresponding summary to extract the key phrase was not sufficiently confident that a known concept corresponds to the key phrase). If the key phrase does not correspond to a known concept, operational flow proceeds to block 510. Otherwise, operational flow proceeds at block 512.

At block 510, the classification system embeds the key phrase and assigns a concept corresponding to the nearest cluster of phrase embeddings. Identifying the nearest cluster depends on the clustering algorithm used, for instance by identifying the nearest cluster centroid in the embedding space to the key phrase embedding.

At block 512, the classification system adds a node for the key phrase and a node for the concept to the knowledge graph with an edge from the key phrase to the concept. The edge can indicate a relationship between the key phrase and the concept that explains why the key phrase is associated with the concept.

At block 514, the classification system determines if there is an additional key phrase. If there is an additional key phrase, operational flow returns to block 506. Otherwise, operational flow proceeds to block 516.

At block 516, the classification system adds category nodes and edges to corresponding concepts present in the knowledge graph according to the concept-to-category relationship mappings. The classification system additionally adds edges between overlapping categories and/or categories having hierarchical relationships.

Variations

The foregoing description refers to determining categories for key phrases by first associating key phrases with concepts and concepts with categories. In other embodiments, key phrases can be directly associated with categories, and concepts can be added, merged, and escalated or reassessed as categories as high volumes of key phrases are associated with the concepts and as the concepts are evaluated and confirmed to be categories of web page content or determined to overlap with or be subsumed by other concepts. Accordingly, knowledge graphs can have edges that directly connect key phrases to categories.

Based on a classification of web content for a web page according to the foregoing description, one or more remediation actions can be performed. For instance, for a malicious web page classification, network traffic to and from the web page can be blocked, a domain name or URL can be added to a list of known malicious domain names/URLs, a notification, report, and/or alert can be communicated to an administrator of an associated cybersecurity system, etc.

The knowledge graphs in the foregoing are depicted as directed graphs for illustrative purposes to demonstrate the transition from key phrases to concepts and from concepts to categories. In general, the knowledge graphs and stored representations of the knowledge graphs can be undirected, although the relationship edge labels indicate the direction of the relationship for the corresponding nodes.

The flowcharts are provided to aid in understanding the illustrations and are not to be used to the limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 500, 502, and 504 can be performed independently of the remaining operations depicted in FIG. 5. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platforms (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, that employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
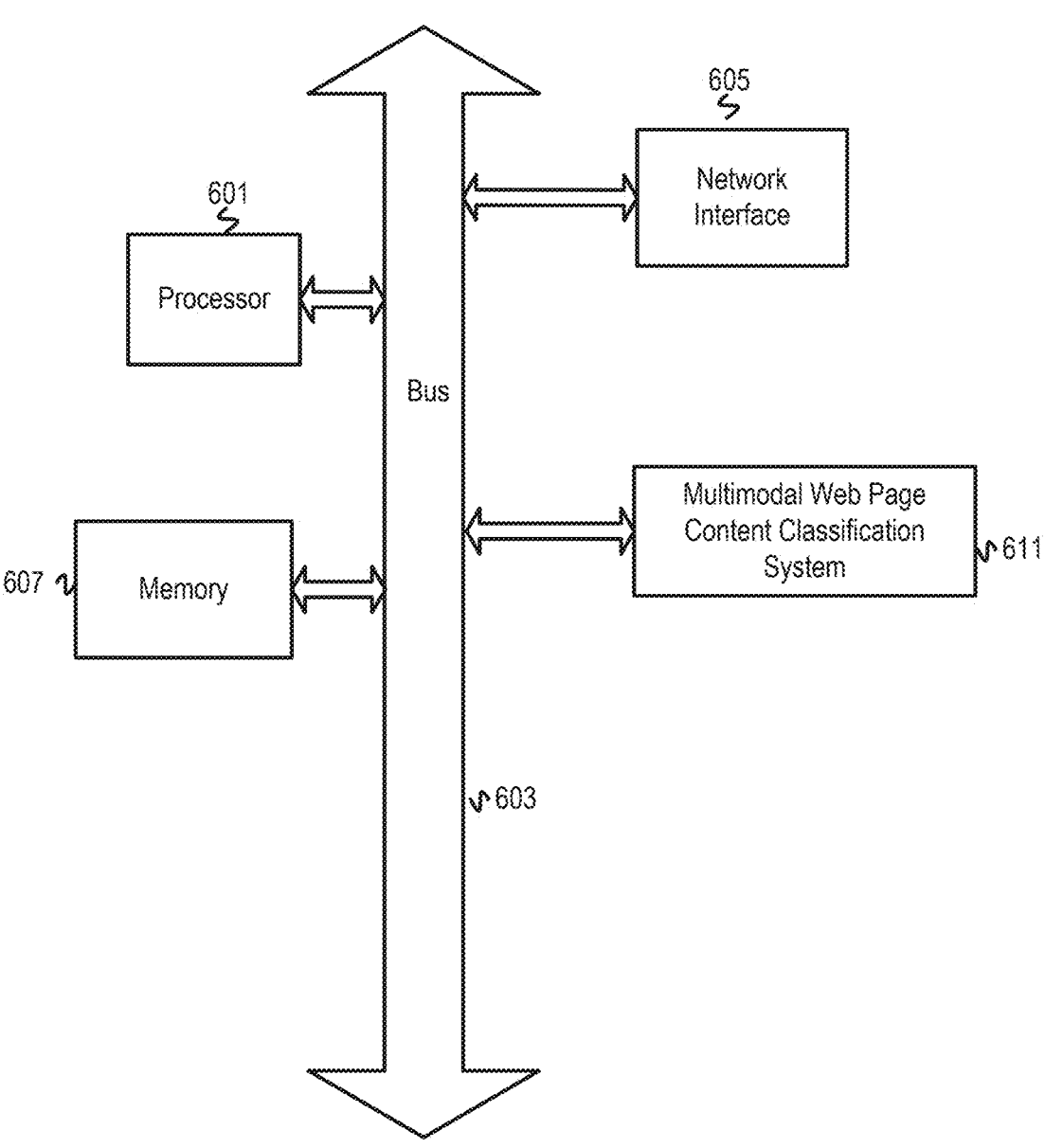
FIG. 6 depicts an example computer system with a multimodal web page content classification system.

FIG. 6 depicts an example computer system with a multimodal web page content classification system. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a multimodal web page content classification system ("classification system") 611. The classification system 611 crawls the Internet for web page content and generates multiple summaries for multiple modalities of web page content. The classification system 611 then extracts annotated key phrases and corresponding concepts from each summary. The classification system 611 populates a knowledge graph based on the key phrase/concept pairs, known category/concept pairs corresponding to concepts in the key phrase/concept pairs, and overlapping categories. Decision tree-based classifiers deployed by the classification system 611 use a representation of the knowledge graph to classify a category for the web page content. The resulting classification is explainable via both the multimodal summaries and topology of the knowledge graph. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

generating a plurality of summaries of content of a web page, wherein each of the plurality of summaries corresponds to one of a plurality of modalities of web page content, wherein generating the plurality of summaries of the content for the web page comprises invoking a first large language model with a first prompt comprising a descriptor of each modality of the plurality of modalities of web page content and task instructions to summarize the modality for the content of the web page;

annotating the plurality of summaries with one or more concepts corresponding to a plurality of phrases in the plurality of summaries, wherein annotating the plurality of summaries comprises invoking a transformer model to, identify the plurality of phrases in the plurality of summaries; and determine concepts in the one or more concepts corresponding to each of the plurality of phrases;

generating a knowledge graph that represents relationships between the plurality of summaries, the one or more concepts, and a plurality of categories of web content, wherein each node in the knowledge graph indicates at least one of a summary in the plurality of summaries, a category in the plurality of categories, and a concept in the one or more concepts, and wherein each edge in the knowledge graph indicates at least one of, a relationship between a phrase of the plurality of phrases and a concept for the phrase in the one or more concepts, wherein the phrase is in a summary of the plurality of summaries that is represented by a node, and a relationship between a concept in the one or more concepts and a category in the plurality of categories; and categorizing the content of the web page based, at least in part, on the knowledge graph.

2. The method of claim 1, wherein determining the category for the content of the web page comprises invoking a decision tree-based classifier on the knowledge graph to obtain the category as output.

3. The method of claim 1, wherein generating the knowledge graph comprises invoking a second language model with a second prompt comprising task instructions to identify relationships between phrases in the plurality of phrases and categories in the plurality of categories.

4. The method of claim 1, wherein the plurality of modalities comprises a uniform resource locator modality, a text modality, and an image modality.

5. The method of claim 1, further comprising identifying evidence for the category of the content based, at least in part, on connections between the plurality of phrases and the category in the knowledge graph.

6. The method of claim 5, wherein identifying the evidence for the category of the content comprises invoking a fourth language model to identify the evidence for the category of the content based, at least in part, on connections between the plurality of phrases and the category in the knowledge graph.

7. The method of claim 3, wherein the second language model comprises a second large language model.

8. A non-transitory machine-readable medium having program code stored thereon, the program code comprising instructions to:

generate a plurality of summaries of content of a web page, wherein each of the plurality of summaries corresponds to one of a plurality of modalities of web page content, wherein the instructions to generate the plurality of summaries of the content for the web page comprise instructions to invoke a first large language model with a first prompt comprising a descriptor of each modality of the plurality of modalities of web page content and task instructions to summarize the modality for the content of the web page;

annotate the plurality of summaries with one or more concepts corresponding to a plurality of phrases in the plurality of summaries, wherein the instructions to annotate the plurality of summaries comprise instructions to invoke a transformer model to, identify the plurality of phrases in the plurality of summaries; and determine concepts in the one or more concepts corresponding to each of the plurality of phrases;

build a knowledge graph that represents relationships between the plurality of summaries, the one or more concepts, and a plurality of categories of web content, wherein each node in the knowledge graph indicates at least one of a summary in the plurality of summaries, a category in the plurality of categories, and a concept in the one or more concepts, and wherein each edge in the knowledge graph indicates at least one of, a relationship between a phrase of the plurality of phrases and a concept for the phrase in the one or more concepts, wherein the phrase is in a summary of the plurality of summaries that is represented by a node, and a relationship between a concept in the one or more concepts and a category in the plurality of categories; and categorize the content of the web page based, at least in part, on the knowledge graph.

9. The non-transitory machine-readable medium of claim 8, wherein the instructions to determine the category for the content of the web page comprise instructions to invoke a decision tree-based classifier on the knowledge graph to obtain the category as output.

10. The non-transitory machine-readable medium of claim 8, wherein the instructions to generate the knowledge graph comprise instructions to invoke a second language model with a second prompt comprising task instructions to identify relationships between phrases in the plurality of phrases and categories in the plurality of categories.

11. The non-transitory machine-readable medium of claim 8, wherein the plurality of modalities comprises a uniform resource locator modality, a text modality, and an image modality.

12. The non-transitory machine-readable medium of claim 8, wherein the program code further comprises instructions to identify evidence for the category of the content based, at least in part, on connections between the plurality of phrases and the category in the knowledge graph.

13. The non-transitory machine-readable medium of claim 12, wherein the instructions to identify the evidence for the category of the content comprise instructions to invoke a fourth language model to identify the evidence for the category of the content based, at least in part, on connections between the plurality of phrases and the category in the knowledge graph.

14. The non-transitory machine-readable medium of claim 10, wherein the second language model comprises a second large language model.

15. An apparatus comprising:

a processor; and a machine-readable medium having instructions stored thereon that are executable by the processor to cause the apparatus to:

generate a plurality of summaries of content of a web page, wherein each of the plurality of summaries corresponds to one of a plurality of modalities of web page content, wherein the instructions to generate the plurality of summaries of the content for the web page comprise instructions executable by the processor to cause the apparatus to invoke a first large language model with a first prompt comprising a descriptor of each modality of the plurality of modalities of web page content and task instructions to summarize the modality for the content of the web page;

annotate the plurality of summaries with one or more concepts corresponding to a plurality of phrases in the plurality of summaries, wherein the instructions to annotate the plurality of summaries comprise instructions executable by the processor to cause the apparatus to invoke a transformer model to, identify the plurality of phrases in the plurality of summaries; and determine concepts in the one or more concepts corresponding to each of the plurality of phrases;

build a knowledge graph that represents relationships between the plurality of summaries, the one or more concepts, and a plurality of categories of web content, wherein each node in the knowledge graph indicates at least one of a summary in the plurality of summaries, a category in the plurality of categories, and a concept in the one or more concepts, and wherein each edge in the knowledge graph indicates at least one of, a relationship between a phrase of the plurality of phrases and a concept for the phrase in the one or more concepts, wherein the phrase is in a summary of the plurality of summaries that is represented by a node, and a relationship between a concept in the one or more concepts and a category in the plurality of categories; and categorize the content of the web page based, at least in part, on the knowledge graph.

16. The apparatus of claim 15, wherein the instructions to determine the category for the content of the web page comprise instructions executable by the processor to cause the apparatus to invoke a decision tree-based classifier on the knowledge graph to obtain the category as output.

17. The apparatus of claim 15, wherein the instructions to generate the knowledge graph comprise instructions executable by the processor to cause the apparatus to invoke a second language model with a second prompt comprising task instructions to identify relationships between phrases in the plurality of phrases and categories in the plurality of categories.

18. The apparatus of claim 15, wherein the machine-readable medium further has stored thereon instructions executable by the processor to cause the apparatus to identify evidence for the category of the content based, at least in part, on connections between the plurality of phrases and the category in the knowledge graph.

19. The apparatus of claim 15, wherein the plurality of modalities comprises a uniform resource locator modality, a text modality, and an image modality.

20. The apparatus of claim 17, wherein the second language model comprises a second large language model.

\* \* \* \* \*